Nov. 8, 1955  G. B. LANPHERE  2,723,007
DASH POT STRUCTURE
Filed Feb. 9, 1953  2 Sheets-Sheet 1
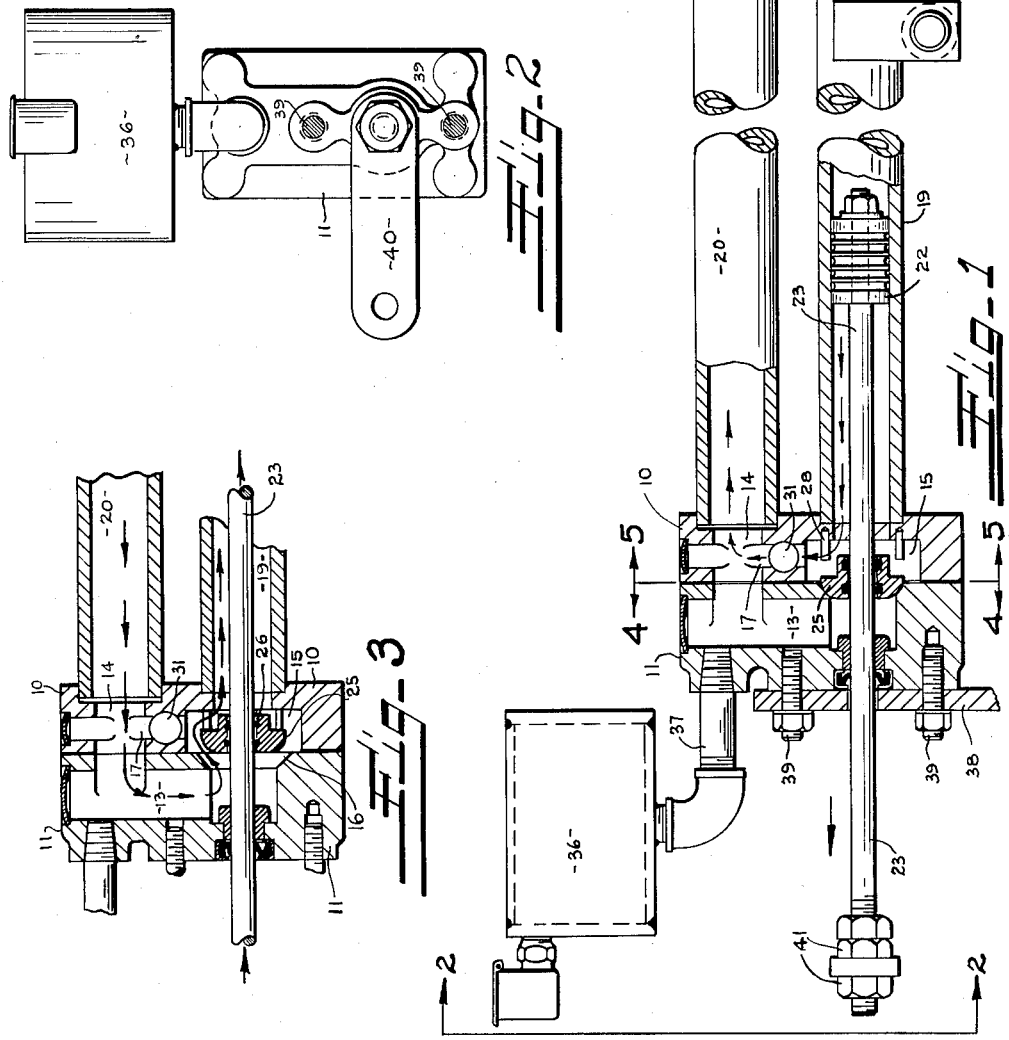
INVENTOR.
GERALD B. LANPHERE
BY D. Emmett Thompson
Attorney Nov. 8, 1955  G. B. LANPHERE  2,723,007
DASH POT STRUCTURE Filed Feb. 9, 1953  2 Sheets-Sheet 2

INVENTOR.
GERALD B. LANPHERE
BY D. Emmett Thompson
Attorney

United States Patent Office 2,723,007
Patented Nov. 8, 1955

2,723,007

DASH POT STRUCTURE

Gerald B. Lanphere, Syracuse, N. Y., assignor to Lipe-Rollway Corporation, Syracuse, N. Y., a corporation of New York Application February 9, 1953, Serial No. 335,887

3 Claims. (Cl. 188—97)

This invention relates to a dash pot structure, and has as an object a structure of the type described embodying a particularly simple and compact structural arrangement including means for varying the resistance offered the movable element of the structure when the same is moved in one direction.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a side elevational view of a dash pot structure embodying my invention, with parts shown in section.

Figure 2 is an end elevational view indicated by the line 2—2, Figure 1, with the mounting bracket removed.

Figure 3 is a vertical sectional view of the body and contiguous parts similar to that shown in Figure 1 but with the valve moved out of engagement with the valve passage.

Figure 4:
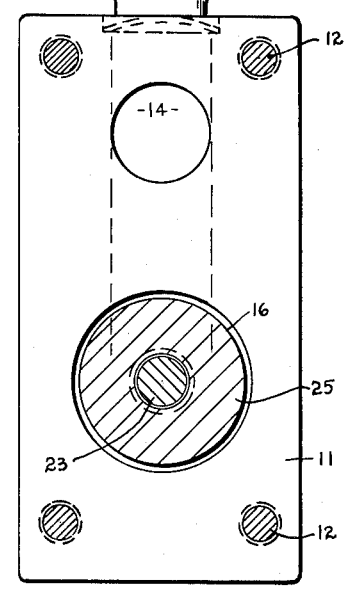
Figure 5:
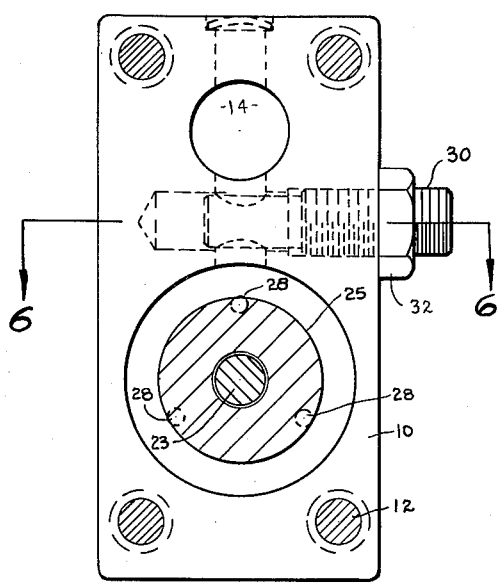
Figure 6:
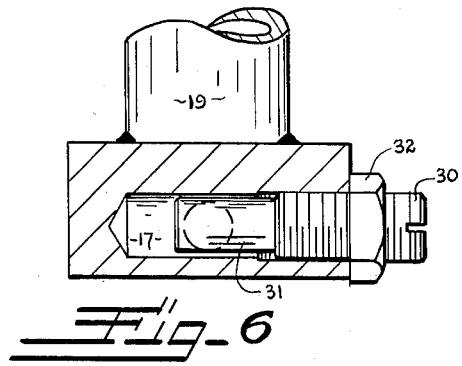

Figure 4 is a view taken on line 4—4, Figure 1.
Figure 5 is a view taken on line 5—5, Figure 1.
Figure 6 is a view taken on line 6—6, Figure 5.

The dash pot structure consists of a body formed of mating sections 10, 11, the confronting surfaces of which are secured together in fluid tight relation by bolts 12. The section 11 is formed with a chamber 13 communicating at its upper end with a chamber 14 formed in the section 10, which is also formed with a second chamber 15. The chamber 15 communicates with the chamber 13 through a valve passage 16, and the chamber 15 also communicates with the chamber 13 through the chamber 14 by way of a bleed passage 17.

A pair of conduits 19, 20, are secured at like ends to the section 10 of the body, the conduit 19 being arranged in registration with the valve passage 16 and communicating with the chamber 15. The conduit 20 is in communication with the chamber 14. The outer ends of the conduits 19, 20, are connected together as by a return bend 21.

A piston 22 is mounted for reciprocation in the conduit 19 which serves as a cylinder, and is provided with a piston rod 23 extending through the valve passage 16 and through the opposite or outer wall of the section 11.

A valve 25 is mounted upon the piston rod 23 and has frictional engagement therewith created in part by the packing rings 26, whereby the valve 25 is moved into and out of engagement with the valve passage 16 upon reciprocation of the piston 22 in the cylinder 19. A plurality of pins 28 are mounted on the inner surface of the outer wall of the body section 10 and are positioned for engagement by the valve 25 when the piston 22 is moved in a direction outwardly from the body.

With this arrangement, initial movement of the piston 22 toward the body effects movement of the valve 25 into closing engagement with the valve passage 16, whereby the fluid in the cylinder 19 is forced through the bleed passage 17 and is permitted to flow from the passage 14 through the upper conduit 20 to the conduit 19 on the opposite end of the piston.

A plug 30 is threaded into the body section 10 and has an inner end portion 31 extending into the bleed passage 17. The plug 30 accordingly forms means for varying the cross sectional area of the passage 17 and is locked in adjusted position by a jam nut 32, Figure 6. Accordingly, movement of the piston to the left, Figure 1, is controlled by the flow of fluid through the bleed passage 17 according to the adjustment of the plug 30.

Upon initial movement of the piston 22 to the right, or outwardly from the body, the valve 25 is moved out of closing engagement with the passage 16 and into engagement with the pins 28, the pins serving to position the valve 25 in spaced relation to the outer wall of the section 10 to provide a relatively large passage for the flow of fluid in the reverse direction, as shown in Figure 3, whereby substantially less resistance is offered to the outward movement of the piston.

If it is desired to operate the device with oil, a reservoir 36 may be connected to the interior of the body through a pipe 37 to assure a proper supply of fluid to the device. The body of the structure may be conveniently mounted by a bracket 38 secured to the body by screws 39 and the piston rod 23 secured to a cooperating element by a bracket 40 secured to the outer end of the piston rod, as by jam nuts 41.

It will be observed that the device embodies a particularly compact structure which is economical to manufacture and which will operate over long periods of time without maintenance.

What I claim is:

1. In a dash pot structure comprising a hollow body, a cylinder secured at one end to the body and extending outwardly therefrom, a piston slidably mounted in the cylinder and having a rod extending through the body, the inner end of the cylinder having communication with the interior of the body through a bleed passage and a valve passage, said passage being formed in the body, said valve passage being arranged concentrically with said rod, a valve slidably mounted on the rod and having frictional engagement therewith whereby, upon movement of the piston toward the body, said valve is moved into said valve passage in closing engagement therewith, and a conduit connecting the outer end of said cylinder with the interior of the body.

2. A dash pot structure comprising a hollow body, a cylinder mounted at one end in one side wall of the body and extending outwardly therefrom, a valve passage formed in the opposite side wall of the body in registration with said cylinder, said body being also formed with a bleed passage, a piston mounted for reciprocation in said cylinder and having a piston rod extending through said valve passage, a valve slidably mounted on said piston rod and having frictional engagement therewith and being movable thereby into and out of closing engagement with said valve passage upon reciprocation of the piston in the cylinder, means operable to vary the area of said bleed passage, and a conduit connecting the outer end of said cylinder with said bleed passage and said valve passage.

3. A dash pot structure comprising a hollow body, a pair of conduits mounted at like ends to one side wall of the body and extending outwardly therefrom and being connected at their outer ends, one of said conduits communicating at its inner end directly with the interior of the body, a piston slidably mounted in the other of said conduits, said other conduit communicating with the interior of the body through a bleed passage and a valve passage, said valve passage being arranged in the body in axial registration with said other conduit, said piston having a rod extending through said valve passage, a valve slidably mounted on the rod and having frictional engagement therewith for movement with said rod upon reciprocation of the piston in said other conduit into and out of engagement with said valve passage, and means to vary the area of said bleed passage.

References Cited in the file of this patent

UNITED STATES PATENTS 1,945,499     Flarsheim _____ Jan. 30, 1934